United States Patent [19]

Tomic

[11] 4,126,009

[45] Nov. 21, 1978

[54] INORGANIC CEMENT GROUTING SYSTEM FOR USE IN ANCHORING A BOLT IN A HOLE

[75] Inventor: Ernst A. Tomic, Wilmington, Del.

[73] Assignee: E. I. Du Pont de Nemours and Company, Wilmington, Del.

[21] Appl. No.: 830,475

[22] Filed: Sep. 6, 1977

[51] Int. Cl.$^2$ .......................... E21D 20/02; C04B 7/02
[52] U.S. Cl. ...................... 405/260; 106/90; 166/293
[58] Field of Search .................... 61/45 B, 63, 39; 166/293; 206/219; 106/89, 90, 95

[56] References Cited

U.S. PATENT DOCUMENTS

| | | | |
|---|---|---|---|
| 2,609,880 | 9/1952 | Dyer | 220/840 X |
| 2,800,963 | 7/1957 | Roberts et al. | 166/293 |
| 2,878,875 | 3/1959 | Dunlap et al. | 166/293 |
| 2,890,752 | 6/1959 | Crone et al. | 166/293 |
| 3,126,958 | 3/1964 | Bearden et al. | 166/293 |
| 3,197,428 | 7/1965 | Siegele | 166/293 X |
| 3,242,986 | 3/1966 | Hower et al. | 166/293 |
| 3,428,121 | 2/1969 | Harnsberger | 166/293 X |

FOREIGN PATENT DOCUMENTS

1,293,620  10/1972  United Kingdom .................... 61/45 B

*Primary Examiner*—Dennis L. Taylor

[57] ABSTRACT

In an inorganic cement grouting system for use in anchoring a reinforcing member such as a rock bolt in a hole, e.g., in a mine roof, by the reaction of the mixed components of the system so as to form a hardened grout around the reinforcing member, which system has the following separate components: (1) a slush or sludgy mass of a particulate inorganic cement that sets by hydration and a liquid which is nonreactive therewith, preferably a hydrocarbon, and (2) water containing a particulate aggregate such as sand, a small amount of polyethylene oxide and/or polyacrylamide in the aggregate-containing water component not only thickens the water to prevent its loss from the hole, but acts as a lubricant to facilitate insertion of the reinforcing member while permitting the resulting grout to develop an acceptable shear strength.

4 Claims, No Drawings

INORGANIC CEMENT GROUTING SYSTEM FOR USE IN ANCHORING A BOLT IN A HOLE

BACKGROUND OF THE INVENTION

1. Field of the Invention

The present invention relates to an inorganic cement grouting system for use in a method of anchoring a reinforcing member in a hole, e.g., in a mine roof, wherein reactive inorganic cement components are introduced into a hole and allowed to react and harden therein around a reinforcing member so as to fix it firmly in the hole.

2. Description of the Prior Art

Anchor bolts are employed in various fields of engineering, for example as strengthening or reinforcing members in rock formations and in structural bodies. The bolts are inserted into drill holes in the formation or body, and often are fixed or anchored therein, at their inner end or over substantially their entire length, by means of a reactive grouting composition which hardens around the bolt. For mine roof support, grouting compositions which harden and attain maximum strength rapidly are needed. Reactive compositions which have been used include inorganic cement mortars and hardenable synthetic resins, and these have been introduced into the drill holes through a feed pipe, or in cartridged form. In the latter case, the reactive components, e.g., a polymerizable resin formulation and a catalyst which catalyzes the curing of the resin, are introduced into the hole in separate cartridges or in separate compartments of the same cartridge. A rigid bolt penetrates, and thereby ruptures, the cartridge(s) and the package contents are mixed by rotation of the bolt. The grouting mixture hardens around the bolt so as to anchor it in place.

In the case of inorganic cements, the pumping of a prepared hydraulic cement mortar into a hole after a bolt is in position therein has been described, as has the driving of a bolt into hydraulic cement mortar in a hole. In the former case, complete and uniform filling of the space around the bolt is difficult to ensure; and, in the latter case, the bolt has to be installed immediately after the mortar has been introduced, so that it is not feasible to fill a large number of holes with the mortar first and subsequently to introduce the bolts, a more efficient procedure.

Cartridged hydraulic cement systems for anchoring rock bolts are described in U.S. Pat. No. Re. 25,869, British Pat. Nos. 1,293,619 and 1,293,620, and German OLS No. 2,207,076. In these systems the components of an hydraulic cement mortar are introduced into a drill hole in separate compartments of an easily destructible cartridge. One component of the system, i.e., the hydraulic cement, is placed in one of the compartments in the dry particulate state, i.e., as a dry powder or grit; and the other component, i.e., water, is placed in the other compartment. The cartridge is broken and the components are mixed by driving and rotating the bolt therein. The cartridged system has the advantage that bolts can be installed in the holes at any time after the introduction of the reactive components because the components are kept separated until the installation of the bolt. Also, such a system requires no complex pumping equipment at the site of use.

U.S. Pat. No. Re. 25,869 discloses the use of a glass cylinder filled with a dry Portland cement/sand mixture which has embedded therein a glass capsule containing water and a rapid-hardening agent, e.g., calcium chloride, to shorten the hardening time.

British Pat. Nos. 1,293,619 and 1,293,620 describe the use of a cartridge consisting of inner and outer rigid brittle tubes having at least one end that is readily frangible, the space between the two tubes containing a mixture of Portland cement and high alumina cement, and the inner tube containing water. The addition of an aggregate, e.g., sand or copper slag, a natural gum and salt compound, and a wetting agent to the water also is disclosed.

In German OLS No. 2,207,076, the particulate material in one compartment is gypsum, preferably mixed with a strength-enhancing cement, to which an inert filler such as styrofoam may be added. The use of alginates, polyvinyl alcohol, polyacrylic acid, carboxymethylcellulose, and metallic soaps as gelling agents to increase the viscosity of the water in the other compartment also is disclosed.

Although inorganic cement grouting systems are economically attractive in contrast to resin-curing systems, and generally are not plagued with such problems as instability on storage as are resin-curing systems, cement grouting systems wherein one of the components is a dry cement present certain difficulties in use, especially when applied to the fixing of bolts in drill holes. When compartmented cartridges are used, the bolt must be inserted into the cartridge and penetrate its full length if the components are to be mixed properly. This insertion is difficult to achieve with cartridges containing a dry cement component. The magnitude of the force required to achieve the necessary insertion may exceed the capability of standard bolting equipment available in the working location, e.g., in a mine. Also, the insertion force required with such cartridges may cause the bolt to buckle.

Another problem with the cartridged dry cement component system of the prior art is that the cement component is easily vulnerable to premature hardening should ambient moisture or water from the other compartment penetrate the cartridge seals or packaging material, a situation which could arise on storage or during transportation of cartridges. Lastly, the prior art bolt-anchoring systems employing inorganic cement are not well-suited for use in the uncartridged form, where compact pumping equipment and accurate metering are desirable to deliver the components to the drill hole.

U.S. Pat. No. 3,324,663 describes the reinforcement of rock formations with a two-component resin composition based on (a) an unsaturated polymerizable polyester (alkyd) resin mixed with a monomeric polymerizable ethylenic compound and (b) a cross-linking peroxide catalyst system. A water-reactive filler such as Portland cement or plaster of Paris (5-10 percent of the final composition) is incorporated in either the resin component or the catalyst component, and water is incorporated in the component not containing the water-reactive filler. The water-reactive filler and water are used to modify the basic resin/catalyst system, the presence of water during the curing of the resin being disclosed as causing an imperfect cure and minimizing shrinkage. Water-reactive fillers (up to 5 percent) have been disclosed (U.S. Pat. No. 2,288,321) to shorten the curing time of alkyd resins by reacting with the water formed during curing.

In the grouting system of U.S. Pat. No. 3,324,663, the reactants essential for the formation of a hardened grout are totally organic, i.e., an alkyd resin and a liquid ethylenic monomer, and they are cartridged together in the same compartment, i.e., premixed, the resin being dissolved in the ethylenic monomer and reacting therewith when the separately packaged catalyst is mixed in. Only about 5–10 percent of the total composition is water-reactive filler. The preponderance of resin and catalyst in this system, and the basic resin-curing reaction that occurs, over-ride and obscure any possible secondary reaction involving the water-reactive filler.

Co-pending, co-assigned U.S. patent application Ser. No. 830,473, filed concurrently herewith by David Linn Coursen, describes an improved grouting system wherein a first component of an inorganic grouting composition is a slush or sludgy mass of a particulate inorganic cement, e.g., a cement that sets by hydration, and a liquid which is nonreactive therewith; and a second component of the composition is a liquid which is reactive with the inorganic cement in the first component. An aggregate such as sand preferably is present in one or both of the components, and the reactive liquid preferably is in thickened form.

Cement in slush form has several advantages over the dry cement used in previous rock bolt packages. First, the nonreactive liquid imparts lubricity to the cement so that, when the two components of the grouting composition are packaged in a compartmented cartridge, a bolt can be inserted into the cartridge easily and rapidly. Also, the nonreactive liquid, if substantially immiscible with the reactive liquid, helps to reduce the possibility of the premature setting of the cement as a result of contact with the reactive liquid or its vapors, e.g., ambient moisture, during storage or handling, thereby affording a longer shelf life to the cartridged system. In addition, use of the cement in slush form enables the cement component to be metered accurately and handled in compact pumps for ease of packaging in high-speed form-fill machinery as well as for on-site feed operations. The cement component in slush form also is advantageous in that it is adapted to be delivered intermittently in relatively small quantities as is required for bolt anchoring in holes.

Although thickeners for the water component of cartridged cement grouts for anchoring rock bolts have heretofore been described for increasing the water viscosity, certain problems associated with thickened aggregate/water slushes or slurries have not been considered. When aggregate is present, the aggregate particles tend to segregate and settle out, making packaging and bolt insertion difficult. Because of the limited capability of equipment available in the working location, and because high insertion forces may cause the bolt to bend, it is important that the bolt be able to be inserted smoothly and quickly into the cartridged grout. At the same time, any reduction in strength of the grout caused by the presence of the thickener should be small enough as not to impair the usefulness of the grout.

SUMMARY OF THE INVENTION

The present invention provides an improvement in a grouting system for use in a hole in combination with a reinforcing member wherein a hardened grout is formed around the reinforcing member in the hole by the reaction of the two mixed components of an inorganic grouting composition, thereby anchoring the reinforcing member in the hole, a first component of the inorganic grouting composition being a slush or sludgy mass of a particulate inorganic cement that sets by hydration and a liquid, such as a hydrocarbon, which is nonreactive therewith, a second component, separated from the first, being water, and a particulate aggregate such as sand being present in at least the water component, the improvement comprising polyethylene oxide and/or polyacrylamide in the aggregate-containing water component as a thickener-lubricant.

The term "slush" as used herein to describe the components of the grouting composition denotes a solid-liquid combination of mud-like or sludgy consistency. The term includes solid-liquid combinations of varying degrees of mobility, but in all cases denotes combinations that are readily pumpable.

DETAILED DESCRIPTION

In the grouting system of this invention, a cement that sets by hydration is maintained in the form of a slush or sludgy mass together with a nonaqueous liquid with which it does not react, preferably a hydrocarbon; and the slush is brought together and mixed, preferably in a drill hole, with water, and allowed to react in the hole around a reinforcing member.

A wide variety of nonaqueous liquids can be used as the slush-forming liquid with the cement in the first component of the grouting composition. The specific choice in any given case will be made on the basis of the setting and strength-development time required with the slush-forming liquid, and the latter's cost. Liquid hydrocarbons and essentially anhydrous mixtures containing such hydrocarbons are particularly advantageous from the point of view of setting time as well as cost, and therefore are preferred. A substantially non-volatile liquid is preferred to assure stability under varying conditions of storage and use. For this reason, liquids boiling above about 25° C. at atmospheric pressure are preferred. Thus, preferred hydrocarbon slush-forming liquids are 5–25 carbon atom aliphatic hydrocarbons such as hexanes, heptanes, and octanes; and aromatic hydrocarbons such as benzene and alkyl benzenes, e.g., toluene and xylene. Aromatic or aliphatic hydrocarbon mixtures such as gasoline, naphtha, kerosene, paraffin oil, diesel fuel, fuel oils, lubricating oils, vegetable oils, e.g., linseed, tung, cottonseed, corn, and peanut oils, and crudes such as petroleum and shale oil also can be employed. For use in coal mines, the liquid in the slush must have a flash point above 100° F., and should be low in volatile aromatics.

Although low-viscosity slush-forming liquids are preferred, thick liquids such as asphalt; grease, e.g., hydrocarbon oils thickened with soaps or other viscosity modifiers; animal fats, e.g., lard; and hydrogenated vegetable oils also can be used alone or combined with lower-viscosity liquids.

The cement also can be combined with an alcohol, e.g., methanol, isopropanol, butanol, sec-butyl alcohol, amyl alcohol, glycol, or glycerol; a ketone, e.g., acetone or methyl ethyl ketone; an ester, e.g., dibutyl phthalate or acetyl tributyl citrate; dimethyl sulfoxide; or dimethylformamide; but the setting time of cement from slushes with these compounds generally is much longer than that from slushes with hydrocarbons.

The slush-forming liquid is substantially inert with respect to the cement and other materials present in the first component, substantially anhydrous, and preferably water-immiscible. The latter property affords maximum shelf life, preventing the cement from setting should the slush accidentally come into contact with water prior to use. The slush-forming liquid may, however, be reactive with a material in the second component.

A particulate aggregate, preferably sand, is present in a controlled amount as a filler in the water of the grouting composition, and may also be present in the cement component. In general, aggregate greatly enhances the shear strength of the hardened grout. Other aggregate materials which can be used include particles of competent rocks or rock-forming minerals such as limestone, calcite, granite, basalt, dolomite, andesite, feldspars, amphiboles, pyroxenes, olivine, iron oxides, gabbro, rhyolite, syenite, diorite, dolerite, peridotite, trachyte, obsidian, quartz, etc., as well as materials such as vitrified clay, slag, cinders, fly ash, glass cullet, and fibrous materials such as chopped metal (preferably steel) wire, glass fibers, asbestos, cotton, and polyester and aramide fibers. Sands having different particle shapes and sizes can be used. Mixtures of different aggregates also can be used.

For a given system, the shear strength of the hardened grout increases with increasing aggregate content up to about 60–70 percent by weight based on the total weight of the two components. At the same time, however, mixing of the components becomes increasingly difficult as the aggregate content increases. Also, too high an aggregate content, e.g., 90 percent or more based on the total weight of the grout, results in a brittle, impact-sensitive product which is of no use for anchoring a reinforcing member in a hole. Therefore, while an aggregate content of up to about 80 percent can be employed, a content above about 70 percent is not preferred on the basis of ease of mixing and because there is little if any shear strength increase to be gained by exceeding 70 percent. Also, an aggregate/cement weight ratio in the range of about from 1/1 to 4/1 is preferred. Usually at least about 10 percent, and preferably at least about 20 percent, of the total weight of the two components will be aggregate.

In the present system, 100 percent of the aggregate can be in the water, or the aggregate can be distributed, e.g., in proportions of 1/1, between the two reaction components. The specific aggregate distribution in any given case usually will be selected on the basis of that which gives a desired viscosity balance and ease of mixing.

The hardened grout produced around the reinforcing member forms as a result of the reaction between the cement in the first component and the water in the second component. Organic resin-curing systems are not required, and the reactant(s) which undergo a hardening reaction therefore are substantially all-inorganic. The development of strength in the hardened grout sufficient to anchor a bolt securely in place in a hole in a mine roof, and provision of the components in a form such that they can be delivered and mixed conveniently, require a balance of the content of cement, slush-forming liquid, water, and aggregate. On this basis, although it is possible to make a marginally satisfactory grout from compositions containing 5–10 percent cement, in order to provide maximum strength capability it is preferred that the amount of cement constitute more than 10 percent of the total weight of the two components. Sufficient water should be present to react with the cement, e.g., sufficient to give a water/cement weight ratio of at least about 0.1, and preferably at least about 0.3. In order to be able to allow for the incorporation of a sufficient amount of aggregate and water into the system, the amount of cement will not exceed about 80 percent of the total weight of the two components; and a maximum cement content of about 50 percent is preferred inasmuch as no advantage in terms of final strength is seen in exceeding this amount.

The specific amounts of liquid used in the two components will depend on the amount of solids present, ease of delivery, mixing, etc. From strength considerations, it is undesirable to exceed significantly the stoichiometric amount of water and the amount of nonaqueous slush-forming liquid required to give the necessary lubricity and deliverability (e.g., pumpability). A liquids/solids weight ratio of the combined components in the range of about from 0.1 to 0.6 is satisfactory from the viewpoint of strength, and handling and mixing considerations. In accordance with these considerations, the water/cement weight ratio generally will not exceed about 1.0, preferably 0.7; and the amount of water, based on the total weight of the two components will be about from 2 to 50, and preferably 5 to 30, percent. Also, the amount of slush-forming liquid (nonaqueous liquid in the first component) will vary about from 5 to 50, preferably 8 to 20, percent of the total weight of the two components; or about from 10 to 75 percent, preferably 35 to 65 percent, of the weight of the cement.

The aggregate-containing water component, i.e., a slush or slurry of aggregate and water, contains a small amount of polyethylene oxide, polyacrylamide, or a mixture of the two. These two materials not only provide the thickening effect needed to reduce the chance that the water will run out of an upward-slanting hole or soak into fissures or pores in the hole wall, but are lubricants as well, in the sense that they facilitate the insertion of a bolt into the aggregate-water slush, the aggregate having less tendency to settle or pack in water containing these materials. Moreover, the beneficial effect of these thickener/lubricants is achieved with sufficiently small amounts thereof that grout shear strength is not severely compromised. Generally, the amount of polyethylene oxide and/or polyacrylamide in the water component will be in the range of about from 0.01 to 5 percent of the total weight of the two reaction components, the lower end of the range being used with materials of higher molecular weight and/or having more hydrophilic groups. However, more than about 0.2 percent, based on the total weight of the two reaction components, usually will not be necessary.

One or more surface-active agents can be incorporated into the reaction system, in either one or both of the components. A surface-active agent in the cement slush or in the aggregate slush produces the consistency of a smooth paste, which results in improved ease of mixing of the components. The surface-active agent should be soluble in the liquid of the component in which it is used, and should give a hydrophilic-lipophilic balance value of about from 8 to 14, as determined according to the methods outlined in "The Atlas HLB System", Atlas Chemical Industries, Inc., 1962. Only about 0.01 to 1.0 percent of surface-active agent is needed based on the total weight of the two components. However, since the presence of a surface-active agent can result in a hardened grout of lower shear strength, it is necessary to assess what effect, if any, the surfactant under consideration has on strength, and to balance this finding against the advantage to be gained in ease of mixing. Surfactants which can be used include sorbitan monooleate and monolaurate, polyoxyethylene monooleate and hexaoleate, polyoxyethylene sorbitan trioleate and monolaurate, and polyoxyethylene tridecyl ether. Of these, all are oil-soluble except the polyoxyethylene sorbitan esters, which are water-soluble, although the tridecyl ether is only sparingly soluble in oil.

The present grouting system can be used wherever structure reinforcement is required, e.g., in rock bolting or roof bolting in coal or metal mines, or to secure bolts in holes drilled in concrete structures. While the system may itself provide the reinforcement without a bolt, it finds its greatest advantage in bolt anchoring because anchored bolts give better reinforcement and because a bolt or the like may be used in any case to mix the components in the drill hole. In one embodiment, the components of the system are delivered to the drill hole by pumping through separate feeding conduits communicating with the hole either prior to or after the bolt has been inserted, preferably before bolt insertion. The pumped components can be brought together and mixed just outside the hole, at the hole opening, or in the hole. Preferably, however, they are pumped separately into the hole and mixed therein. A preferred system comprises a frangible compartmented package having the two components in separate compartments, e.g., as shown in U.S. Pat. Nos. 3,795,081 and 3,861,522, the disclosures of which are incorporated herein by reference. In use, this package is inserted into a drill hole, and a bolt is forced into the package, tearing the film and penetrating a part or the full length of the package. The components are mixed by rotation of the bolt, and subsequently react with hardening so as to secure the bolt in the hole.

The invention will now be illustrated by way of the following examples. Parts are by weight.

EXAMPLE 1

A two-component reaction system of the following composition was made:

| Component A | Component B | |
|---|---|---|
| 19.05% cement | 0.12% | polyacrylamide |
| 28.57% sand | 28.57% | sand |
| 11.43% oil | 12.26% | water |

The percentages are percent of the ingredients by weight, based on the total combined weight of the two components. The cement was "Very High Early Strength" (VHE) cement, manufactured by U.S. Gypsum Co., a fast-setting hydraulic cement described in U.S. Pat. No. 3,860,433. The polyacrylamide was "Polyhall" 295, made by the Stein Hall Company. The sand was Ottawa Silica Company's Banding Sand characterized by a surface area of about 160 cm²/g. The oil was kerosene. The slush of cement, sand, and oil was kept separated from the thickened water/sand combination. For strength testing, the two components were mixed to substantial homogeneity, whereupon oil was exuded therefrom, and the resulting paste-like composition hardened.

The shear strength of the grout, measured after 24 hours, was 4800 psi. The method of measurement was the following:

A sample of the freshly mixed grout was placed on polyethylene terephthalate film, and a stainless steel ring, 0.625 inch (15.9 mm) in diameter and 0.115 inch (2.92 mm) high, was placed on the grout. A piece of polyethylene terephthalate film was placed over the ring, and the latter then was pressed evenly into the grout by means of a block of wood. The resulting "shear button" of the grout was placed on an Instron testing machine (conforming to ASTM Method E4, Verification of Testing Machines), and tested (24 hours after mixing) for shear strength by the method of ASTM D732. In this test, a plunger was brought down onto the grout at a rate of 0.5 inch (12.7 mm) per minute. The shear strength was calculated from the applied force to cause failure, according to the following equation:

$$\text{shear strength (psi)} = \frac{\text{Force (lbs)}}{\text{Specimen thickness} \times \pi \times \text{diam. of punch}}$$

The grout also was evaluated after 24 hours in terms of its average pull strength, i.e., 1.26 tons/inch (450 kg/cm), according to the following procedure:

Freshly mixed grout was placed in a section of 1-inch (2.54 cm) threaded pipe, and a standard 0.625-inch (1.59 cm) diameter steel blunt reinforcing rod was inserted into the grout. The excess grout which was squeezed out during insertion of the rod was scraped off, and the pipe-rod assembly was placed into a test fixture mounted in an Instron Universal Testing Machine. The rod was then pulled (24 hours after the mixing of the grout) by applying a measured upward force to the bolt while the pipe section of the pipe-rod assembly was held stationary in the fixture. The force in tons at which the first discontinuity in the recorded force vs. deflection curve was observed was the pull strength.

EXAMPLE 2

Four dual-compartment frangible packages in the form of 18-inch (46 cm) long, 0.9-inch (2.3 cm) diameter "chub" cartridges as described in U.S. Pat. Nos. 3,795,081 and 3,861,522, and containing a two-component reaction system of the invention, were made from a web of polyethylene terephthalate film. One compartment contained a slush of the cement, sand, and oil described in Example 1. The other compartment contained water and the sand and thickener described in Example 1. The ingredients content based on the total combined weight of the contents of the two compartments was as follows:

|  | Cartridges a and b | Cartridges c and d |
|---|---|---|
| cement | 34% | 32% |
| oil | 13% | 13% |
| sand | 31.4%* | 30.2%** |
| water | 21.6% | 24.8% |
| thickener | 0.10% | 0.10% |

*26% in the cement slush; 5.4% in the water
**24% in the cement slush; 6.2% in the water Each sealed cartridge was placed in a 1-inch (2.54 cm) diameter steel pipe having a rough wall and a welded closure at one end (simulated drill hole). The pipe was held in an upright position in a vise with the closed end uppermost. A headed reinforcing rod (bolt) 0.625 inch (15.9 mm) in diameter was inserted into the cartridge with a rotating upward motion, and spun at 300 rpm to mix the contents of the package. A washer closed off the bottom end of the pipe. Ambient temperature was 80° F. After one hour the pull strength of the grout was determined by applying force to the headed end of the bolt in a downward direction at a rate of 0.5 inch (1.27 cm) per minute. The results are shown in the following table:

| Cartridge | Mixing Time (sec) | Force Required To Cause Slippage |
|---|---|---|
| a | 7.5 | 11.2 tons (10 × 10³ kg) |
| b | 20 | 13.2 tons (10.6 × 10³ kg) |
| c | 7.5 | 10 tons (8 × 10³ kg) |
| d | 17.5 | 10.2 tons (8.2 × 10³ kg) |

EXAMPLE 3

The following separate components were prepared:

| Component A (parts) | Component B (parts) |
|---|---|
| cement (27.8) | sand (41.6) |
| oil (13.9) | 1% aqueous thickener solution (16.7) |

The cement, oil, and sand were the same as those used in Example 1. Different mixes of Component B were prepared, each with a different thickener. The 24-hour shear strength of the grout prepared by mixing each of the A components with Component B was measured as described in Example 1. The results were as follows:

| Thickener | | Shear Strength (psi) |
|---|---|---|
| Chemical Type | Commercial Designation | |
| Polyacrylamide | Polyhall 295 (Stein Hall) | 1980 |
| Polyacrylamide | Polyhall M40 (Stein Hall) | 2340 |
| Polyacrylamide | Polyhall 650 (Stein Hall) | 1620 |
| Polyethylene oxide | Polyox 301 (Union Carbide) | 1150 |
| Sodium carboxymethylcellulose | Sodium CMC (Du Pont) | 2120 |
| Sodium carboxymethylcellulose | Sodium CMC (Hercules) | 2600 |
| Methylcellulose derivative | Methocel HD (Dow) | 230 |
| Methylcellulose derivative | Methocel J5MS (Dow) | 720 |
| Methylcellulose derivative | Methocel J75MS (Dow) | 390 |
| Methylcellulose derivative | Methocel E4M (Dow) | 540 |
| Methylcellulose derivative | Methocel K4M (Dow) | 290 |
| Methylcellulose derivative | Methocel K15M (Dow) | 240 |
| Natural gum | Jaguar 180 (Stein Hall) | 2330 |
| Natural gum | Jaguar HP-8 (Stein Hall) | 960 |

When the above-described procedure was repeated with no thickener, the shear strength was 4750 psi.

EXAMPLE 4

A 1-inch (2.54-cm) inner diameter steel pipe was filled with a mixture of 75% sand (−35 mesh "Sakrete" made by H. T. Campbell Company, Towson, Maryland) and 25% of a 1% aqueous solution of a thickener, and a 0.625-inch (15.9-mm) diameter steel reinforcing rod was moved downward into the mixture in an Instron machine at a rate of 20 inches (51 cm) per minute. The force required to insert the rod 1 inch was measured. The results were as follows:

| Thickener | Force Needed For 1-in. Penetration (lbs.) |
|---|---|
| Polyox 301 | 13 |
| Methocel HD | 56 |
| Polyhall 295 | 143 |
| Jaguar 180 | 227 |
| Sodium CMC | 235 |
| Hercules CMC | 373 |

A force of 1520 lbs. was required when no thickener was present, and 1470 lbs. when no water or thickener was present.

The above examples show that, of the thickeners which permit a shear strength of 1000–2000 psi to be retained, polyethylene oxide and polyacrylamide are superior in ease of bolt penetration, and thus are particularly suited for use in cement grouts for anchoring rock bolts.

EXAMPLE 5

When the procedure described in Example 4 was repeated with the use of the sand described in Example 1 (Banding sand), a force of only 0.5 lb. per inch of insertion was required for the Polyhall 295 solution, and 0.6 lb. per inch for the Polyox 301 solution.

EXAMPLE 6

Different organic liquids were tested as slush-forming liquids by combining 20 parts of VHE cement with 10 parts of the liquid being tested, adding 10 parts of water to the resulting slush, mixing the cement and water components, and testing the resulting grout qualitatively for hardness. The results were as follows:

| Slush-Forming Agent | Grout Characteristics |
|---|---|
| pentane | hard in ~ 7 min. |
| hexane | hard in ~ 7 min. |
| heptane | hard in ~ 7 min. |
| benzene | hard in ~ 5 min. |
| toluene | hard in ~ 10 min. |
| xylene | hard in ~ 7 min. |
| gasoline | hard in ~ 8 min. |
| fuel oil #2 | hard in ~ 9 min. |
| kerosene | hard in ~ 6 min. |
| Nujol | hard in ~ 23 min. |
| methanol | hard in ~ 7 hrs. |

EXAMPLE 7

The following components were prepared:

| Component A | Component B |
|---|---|
| VHE cement (31.16 parts) | sand* (46.74 parts) |
| oil* (6.23 parts) | |
| Span 80** (0.12 part) | polyacrylamide (1% aqueous sol.) (15.58 parts) HLB = 9.1 |
| Tween 85 (0.16 part) | |

*Same as in Example 1
**Sorbitan Monooleate

Component A (113 parts) and Component B (187 parts) were packed into the separate compartments of the polyethylene terephthalate film cartridge described in Example 2. The cartridged grout was subjected to a pull strength test in a simulated drill hole as described in Example 2. Twenty-four hours after the components had been mixed, the pull strength of the hardened grout was 12 tons.

I claim:

1. In a grouting system for use in a hole in combination with a reinforcing member wherein a hardened grout is formed around the reinforcing member in the hole by the reaction of at least two mixed components of an inorganic grouting composition, thereby anchoring the reinforcing member in the hole, a first component of the inorganic grouting composition comprising a slush of a particulate inorganic cement that sets by hydration and a liquid which is nonreactive therewith, a second component, separated from the first, comprising water, and a particulate aggregate being present at least in the second component, the improvement comprising polyethylene oxide and/or polyacrylamide in the aggregate-containing water component as a thickener-lubricant.

2. A grouting system of claim 1 wherein the total amount of said polyethylene oxide and/or polyacrylamide thickener-lubricant is about from 0.01 to 5 percent of the total weight of said two components.

3. A grouting system of claim 2 wherein said particulate aggregate is present in an amount such as to constitute about from 10 to 80 percent of the total weight of said components.

4. A grouting system of claim 2 wherein said liquid nonreactive with said cement is a hydrocarbon, and said aggregate is sand.

* * * * *

UNITED STATES PATENT OFFICE
CERTIFICATE OF CORRECTION

PATENT NO. : 4,126,009
DATED : November 21, 1978
INVENTOR(S) : Ernst Alois Tomic It is certified that error appears in the above-identified patent and that said Letters Patent are hereby corrected as shown below:

Claim 2, line 4, delete "two".

Signed and Sealed this

Twenty-fourth Day of April 1979

[SEAL]

Attest:

RUTH C. MASON
Attesting Officer

DONALD W. BANNER
Commissioner of Patents and Trademarks